(12) United States Patent
Uozumi et al.

(10) Patent No.: US 7,780,110 B2
(45) Date of Patent: Aug. 24, 2010

(54) FILAMENT WINDING APPARATUS

(75) Inventors: Tadashi Uozumi, Kyoto (JP); Hiroki Takashima, Kyoto (JP); Motohiro Tanigawa, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 175 days.

(21) Appl. No.: 12/196,158

(22) Filed: Aug. 21, 2008

(65) Prior Publication Data
US 2009/0065625 A1  Mar. 12, 2009

(30) Foreign Application Priority Data
Sep. 12, 2007  (JP) ............................. 2007-237193

(51) Int. Cl.
*B21C 47/02* (2006.01)

(52) U.S. Cl. ..................... 242/444; 242/438; 242/445.1; 242/448

(58) Field of Classification Search ................ 242/437, 242/438, 444, 444.3, 444.4, 445.1, 447.1, 242/448

See application file for complete search history.

(56) References Cited

U.S. PATENT DOCUMENTS

| 4,330,349 | A | * | 5/1982 | Swift et al. | ................... 156/72 |
| 5,273,603 | A | * | 12/1993 | Park et al. | ................... 156/175 |
| 6,585,842 | B1 | * | 7/2003 | Bompard et al. | ............ 156/166 |

FOREIGN PATENT DOCUMENTS

JP          05-338043          12/1993

* cited by examiner

*Primary Examiner*—Emmanuel M Marcelo
(74) *Attorney, Agent, or Firm*—Hogan Lovells US LLP

(57) ABSTRACT

A filament winding apparatus equipped with a transfer mechanism of a terminating end of a fiber bundle using a transfer ring that can be switched from a mandrel after the winding process to a mandrel before the winding process. A cutter cuts a fiber bundle wound around a first transfer ring integral with a mandrel after the winding process and a second transfer ring is moved to the mandrel before the winding process between the first and second transfer rings; and a friction roller positions and holds the second transfer ring when cutting the fiber bundle. The friction roller is pressed and biased against the second transfer ring by a compression spring.

13 Claims, 11 Drawing Sheets

BACK ← → FRONT

_(1)_

FILAMENT WINDING APPARATUS

RELATED APPLICATIONS

This application claims the benefit of priority under 35 USC 119 of Japanese patent application no. 2007-237193, filed on Sep. 12, 2007, which is incorporated herein by reference.

BACKGROUND OF THE INVENTION

1. Field of the Invention

The present invention relates to a filament winding apparatus equipped with a transfer mechanism that separates a terminating end of a fiber bundle from the fiber bundle wound around a mandrel after a winding process, and transfers the terminating end to a next mandrel before the winding process.

2. Description of the Related Art

In the field of filament winding apparatuses that perform a winding process of a fiber bundle on a mandrel, development of a totally-automated system with an aim of continuous production is being advanced. In order to realize automation of a series of winding processes, the mandrel after the winding process and the mandrel before the winding process need to be automatically replaced at a winding unit of the fiber bundle. Furthermore, a mechanism of separating a terminating end of the fiber bundle from the fiber bundle wound around the mandrel after the winding process, and holding the terminating end as a starting end when performing the winding process on the next mandrel is necessary.

In Japanese Laid-Open Patent Publication No. 5-338043, for example, a shaft-shaped jig arranged at both sides of a mandrel is supported with spindles arranged facing each other, and a fiber bundle is reciprocated along a longitudinal direction of the mandrel with a traverse device while one spindle is rotatably driven to wind the fiber bundle around the mandrel. The other spindle is axially supported in a freely rotating manner with a west drum. After the winding process on the mandrel is finished, the fiber bundle is wound over the west drum a few times and cut with a dedicated cutter. The winding process is performed on the mandrel to be loaded next with the fiber bundle wound on the west drum as a starting end of winding.

In the filament winding apparatus of Japanese Laid-Open Patent Publication No. 5-338043, the terminating end of the fiber bundle is wound around the west drum that supports the distal end of an attachment jig fixed to the mandrel. According to Japanese Laid-Open Patent Publication No. 5-338043, a reverse-rotation drive of the west drive and the like are necessary to transfer the terminating end of the fiber bundle on the west drum to the attachment jig of the mandrel loaded next (so as not to leave the fiber bundle on the west drum), and thus it is troublesome until the start of the winding process on the mandrel.

SUMMARY OF THE INVENTION

In the filament winding apparatus according to the present invention, a terminating end of a fiber bundle is wound around a dedicated transfer member. The terminating end of the fiber bundle is transferred as the starting end in the case of performing the winding process on the next mandrel by switching the transfer member from the mandrel after the winding process to the mandrel before the winding process to be loaded next to the winding unit.

The present invention aims to prevent, in a filament winding apparatus equipped with a transfer mechanism of a terminating end of a fiber bundle using a transfer member that can be switched from the mandrel after the winding process to the mandrel before the winding process, troubles such as sagging or loosening of the fiber bundle when separating the terminating end of the fiber bundle to prevent winding failure of the fiber bundle or delay of the totally-automated continuous production system.

In order to overcome the problems described above, embodiments of the present invention relate to a filament winding apparatus including a winding unit that winds a fiber bundle around a mandrel; a loading/removing unit that loads a mandrel before a winding process to the winding unit, and removes a mandrel from the winding unit after the winding process; and a transfer mechanism that separates a terminating end of the fiber bundle from the fiber bundle wound around the mandrel after the winding process, and transfers the terminating end to the mandrel before the winding process. The filament winding apparatus further includes a cutter that cuts the fiber bundle wound around a first transfer member integral with the mandrel after the winding process and a second transfer member to be moved to the mandrel before the winding process between the first and the second transfer members, and holding means that positions and holds the second transfer member during the cutting by the cutter.

The holding means may include a friction member to be pressed against an outer circumferential surface of the second transfer member, and a biasing member that biases the friction member towards the second transfer member. The friction member may be a friction roller rotatably supported by a shaft parallel to a shaft-shaped attachment jig fixed to the mandrel.

The holding means may include a roller supporting board subjected to biasing force from the biasing member; and a plurality of friction rollers may be lined in a circumferential direction of the outer circumferential surface of the second transfer member, and axially supported at the roller supporting board.

The filament winding apparatus according to the present invention includes a cutter that cuts the fiber bundle wound around a first transfer member integral with the mandrel after the winding process and a second transfer member to be moved to the mandrel before the winding process between the first and the second transfer members, and holding means that positions and holds the second transfer member during the cutting by the cutter. According to such holding means, displacement of the second transfer member caused by the tensile force of the fiber bundle bridged across the second transfer member and the winding unit is regulated when the terminating end of the fiber bundle is separated. Therefore, sagging etc. of the fiber bundle involved in the displacement of the second transfer member is prevented. A filament winding apparatus having high stability and enabling continuous production is thus provided without causing winding failure of the fiber bundle or delay of the totally-automated continuous production system.

If the member to be pressed against the fiber bundle wound around the second transfer member is a friction roller, the friction roller simultaneously rotates with the second transfer member by the friction force between the fiber bundle and the friction roller when the mandrel (attachment jig) is rotated to separate the terminating end of the fiber bundle. If the friction member is formed by a pad and the like, the fiber bundle on the outer circumferential surface of the second transfer member may be rubbed against the pad and the fiber bundle may be damaged, but such rubbing does not occur since the friction roller simultaneously rotates with the second transfer member, and damaging of the fiber bundle is reliably prevented.

When pressing a plurality of friction rollers against the fiber bundle, the biasing force of the biasing member is transmitted in a dispersed manner to a plurality of locations of a circumferential surface of the fiber bundle. In other words, the load received from the friction rollers becomes small at each contacting point of the fiber bundle and the friction rollers, and thus depression etc. of the circumferential surface of the fiber bundle caused by pressing the friction rollers is prevented.

If a single friction roller is used, the biasing force of the biasing member cannot be efficiently transmitted to the second transfer member if a direction of biasing the friction roller is even slightly shifted from the center of the second transfer member. In the worst case, slippage may occur between the fiber bundle and the friction roller, whereby the supporting board of the friction roller and the like contacts and may damage the fiber bundle. In the present invention, however, if a plurality of friction rollers is lined in the circumferential direction of the second transfer member, the roller group sandwiches the second transfer member, and improper position displacement of the roller group and the supporting board is regulated by the second transfer member reliably supported by the winding unit by way of the attachment jig of the mandrel. The biasing force from the biasing member is then accurately transmitted to the second transfer member, and displacement of the second transfer member caused by the tensile force of the fiber bundle is reliably prevented.

Other features, elements, processes, steps, characteristics and advantages of the present invention will become more apparent from the following detailed description of embodiments of the present invention with reference to the attached drawings.

DETAILED DESCRIPTION OF PREFERRED EMBODIMENTS

FIGS. 1-11 show an embodiment of a filament winding apparatus ("FW device") according to the present invention. The FW device is equipped with a supply unit that supports a group of creels; a winding unit that winds a fiber bundle R supplied from the supply unit around a mandrel 1; a loading/removing unit that loads the mandrel before the winding process to the winding unit and that removes the mandrel 1 after the winding process from the winding unit; and a transfer mechanism that separates a terminating end E of the fiber bundle R from the fiber bundle R wound around the mandrel 1 after the winding process, and transfers the terminating end E to the mandrel 1 before the winding process.

The mandrel 1 is made of a metal material such as high strength aluminum material and stainless material, a resin molded article, or the like, and is formed in a container shape including a cylindrical part at the middle and a dome part continuing at both ends of the cylindrical part. While the winding process of the fiber bundle R is being performed in the FW device, a shaft-shaped attachment jig 3 is fixed to a circular-column shaped mouth 2 arranged in a projecting manner at the top of each dome part (see FIG. 6).

The fiber bundle R is a bundle of fibers such as glass or carbon fibers. Thermosetting resin is impregnated in advance to the fiber bundle R wound around the creel. The fiber bundle R fed from the creel may be supplied to the winding unit after impregnating molten resin thereto.

Figure 2:
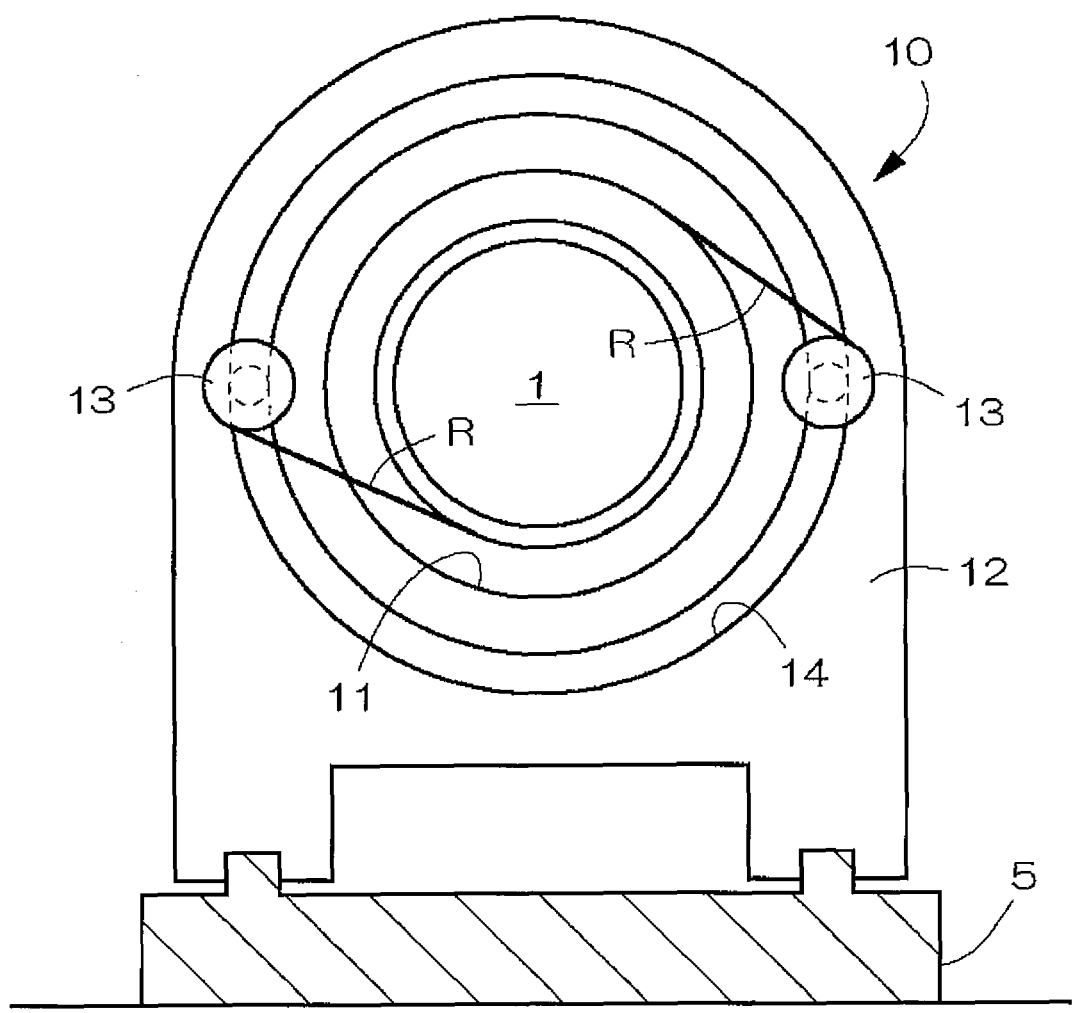
FIG. 2 is a side view of a hoop winding head.

The winding unit of the fiber bundle R mainly includes a hoop winding head 10 that hoop winds the fiber bundle R with respect to the cylindrical part of the mandrel 1, and a helical winding head 20 that helical winds the fiber bundle R with respect to the cylindrical part and the dome part of the mandrel 1. In FIG. 2, the hoop winding head 10 is configured by a frame 12 having a circular opening 11 at the middle, a plurality of bobbins 13 driven in a circular fashion around the opening 11, a guide groove 14 that moves and guides the bobbins 13, a drive mechanism for bobbins 13, and the like.

The mandrel 1 in the winding process is supported at a central portion of the opening 11 while being orthogonal to the frame 12, and the fiber bundle R fed from the bobbins 13 is wound around the mandrel 1 by driving the bobbins 13 in a circular fashion. The winding position of the fiber bundle R with respect to the mandrel 1 can be changed by reciprocating the frame 12 along the longitudinal direction of a base 5.

Figure 3:
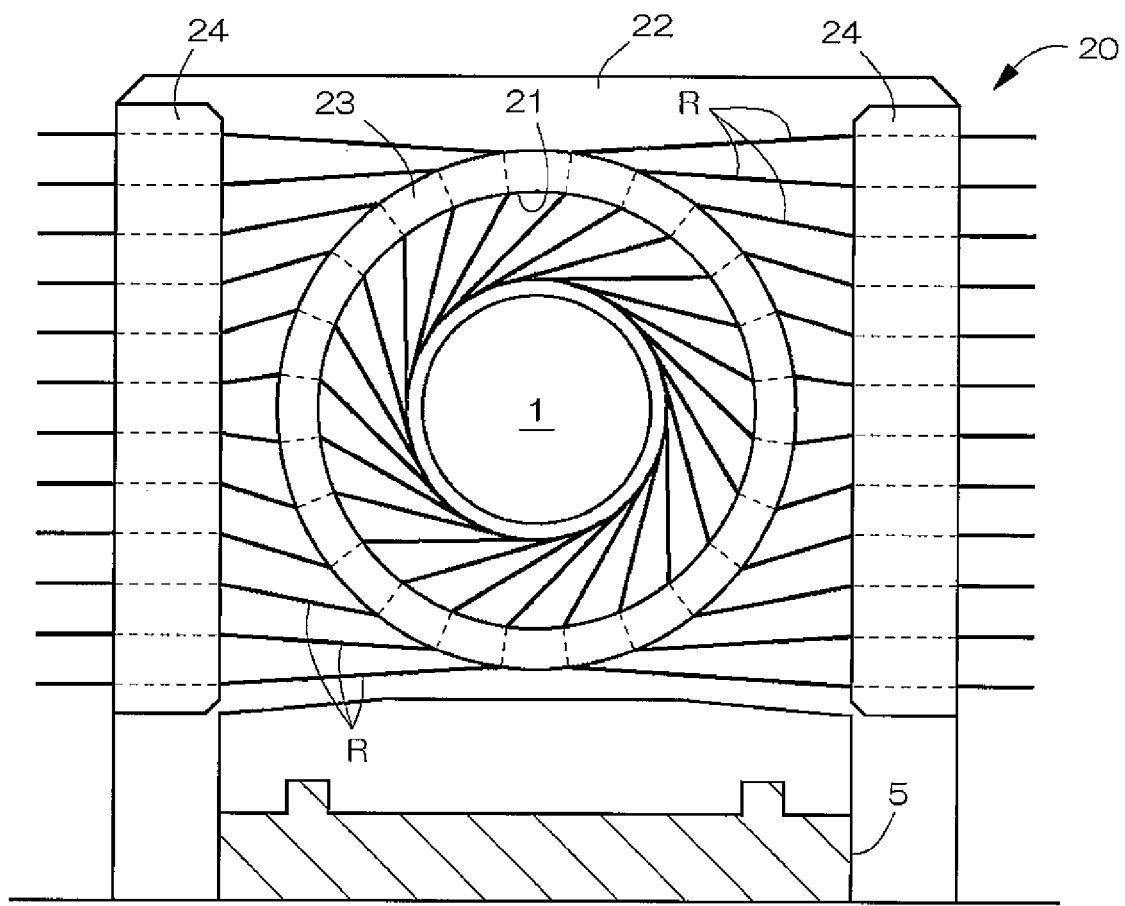
FIG. 3 is a side view of a helical winding head.

In FIG. 3, the helical winding head 20 is configured by a gate shaped frame 22 fixed at the central portion in the longitudinal direction of the base 5, a circular opening 21 formed at the middle of the frame 22, a guide ring 23 arranged at a circumferential edge of the opening 21, a tension preparation unit 24 arranged on both sides of the guide ring 23, and the like. A group of auxiliary guides is arranged at the periphery of the guide ring 23, and a fiber spreading guide is arranged on an inner surface of the guide ring 23 in correspondence to a group of guide holes passing through the guide ring 23. The fiber bundle R supplied from the supply unit is turned and guided with a guide roller arranged on an outer side of the frame 22, applied with a predetermined tensile force by the tension preparation unit 24, and then guided to the guide hole of the guide ring 23.

The mandrel 1 in the winding process is supported at the central portion of the opening 21 while being orthogonal to the frame 22, and the fiber bundle R guided by the guide ring 23 can be wounded along the longitudinal direction of a circumferential surface of the mandrel 1 by rotating the relevant mandrel 1 by a predetermined angle while reciprocating the same.

Figure 6:
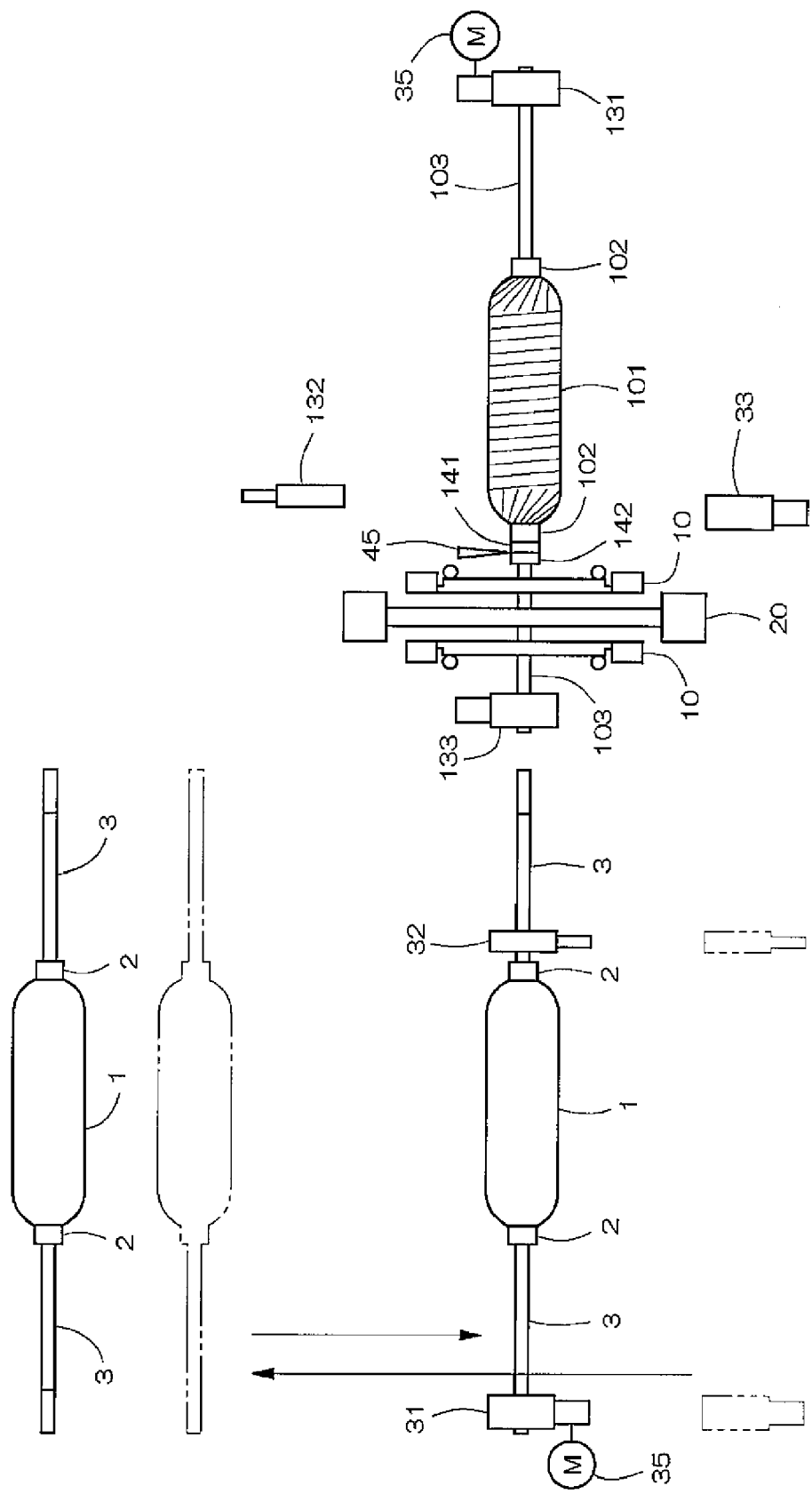
FIG. 6 is an explanatory view of a first process of a manufacturing process of a winding product.

The loading/removing unit that automatically loads the mandrel 1 to the winding unit and removes the mandrel 1 from the winding unit includes three chucks 31, 32 and 33 capable of sandwiching the attachment jig 3 of the mandrel 1, as shown in FIG. 6. The first chuck 31 includes a prime mover gear that is rotatably driven in response to the driving power of the motor 35 and transmits rotational power to the mandrel 1 through the attachment jig 3. Chucks 31, 32 and 33 are configured to be freely movable in a horizontal direction.

The mandrel 1 transported to the vicinity of the FW device by a transportation device is picked up from a supply line of the transportation device while both attachment jigs 3, 3 are sandwiched by the first and second chucks 31, 32. The picked up mandrel 1 is moved onto a center line of the openings 11, 21 of the hoop winding head 10 and the helical winding head 20, and the attachment jig 3 on the side sandwiched by the second chuck 32 is inserted to the openings 11, 21. The winding process by the winding unit is started at the point where the attachment jig 3 inserted to the openings 11, 21 is shifted from the second chuck 32 to the third chuck 33. The mandrel 1 in the winding process is reciprocated and rotated by the first and third chucks 31, 33.

After the winding process by heads 10, 20 is terminated, the loading/removing unit removes the mandrel 1 after the winding process from the winding position after the attachment jig 3 inserted to the openings 11, 21 is again shifted from the third chuck 33 to the second chuck 32. The mandrel 1 rides on the transportation line of the transportation device to be transported to a heating process of thermally curing the molten resin impregnated or adhered to the fiber bundle R. This is the outline of automatic loading and automatic removal of the mandrel 1 by the loading/removing unit, and the details are described hereinafter.

Figure 1:
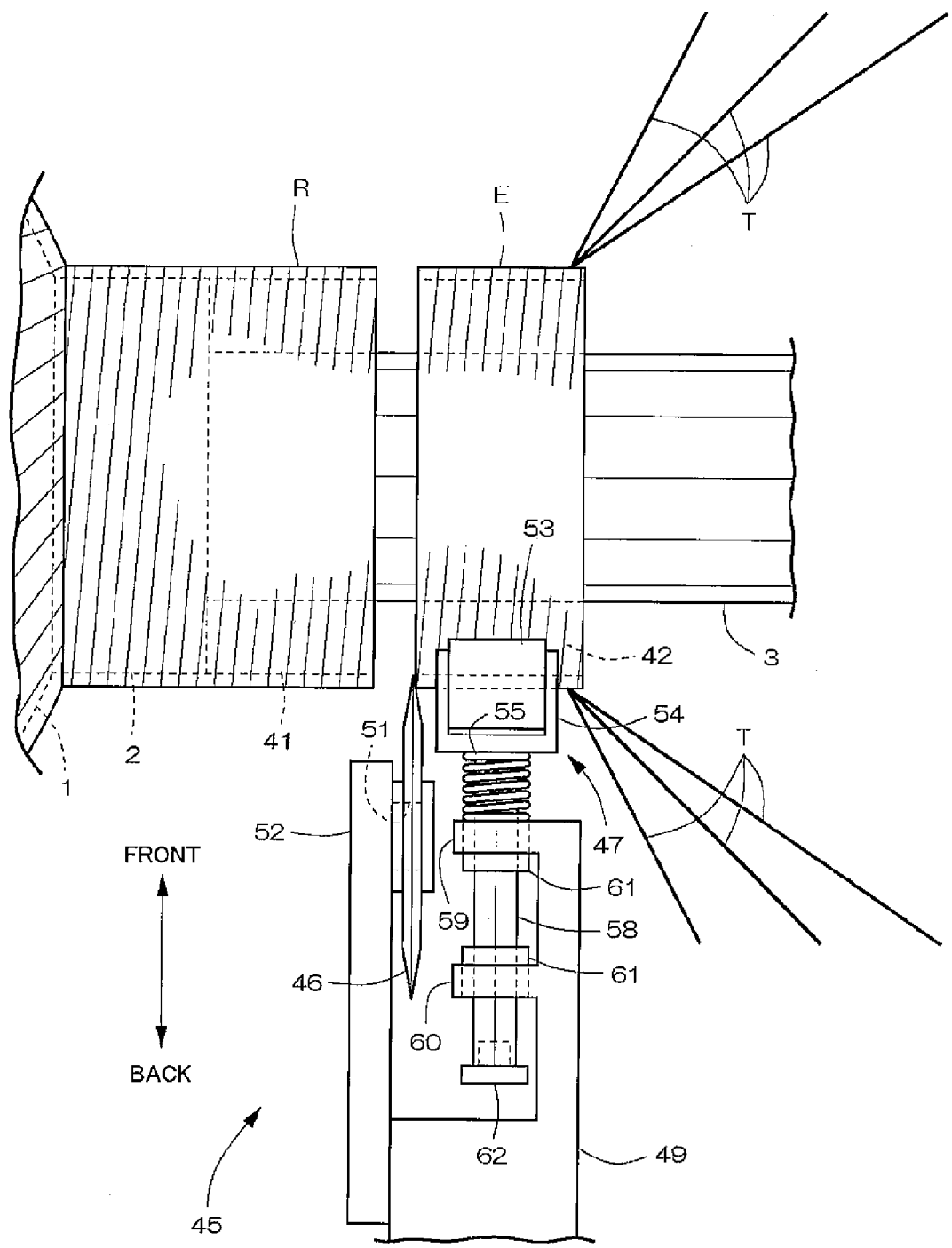
FIG. 1 is a front view of main parts of a filament winding apparatus showing a state in which a terminating end is separated from a fiber bundle.

As shown in FIG. 1, the transfer mechanism of the FW device according to the present embodiment includes two transfer rings (transfer members) 41, 42 attached to one of the attachment jigs 3 of the mandrel 1, and a cutting unit 45 that can cut the fiber bundle R. Transfer rings 41, 42 have the same shape, and the outer diameter dimension thereof is set to be equal to that of the mouth 2. The attachment jig 3 is formed to a spline shaft-shape having numerous projections on an outer circumferential surface, and the transfer rings 41, 42 are formed with spline holes that engage with the projections (see FIG. 5). Therefore, when the mandrel 1 and the attachment jig 3 rotate, the transfer rings 41, 42 also rotate. Furthermore, since each projection of the attachment jig 3 extends in an axial direction, the transfer rings 41, 42 can be slidably displaced in the axial direction while being guided by the attachment jig 3.

Figure 4:
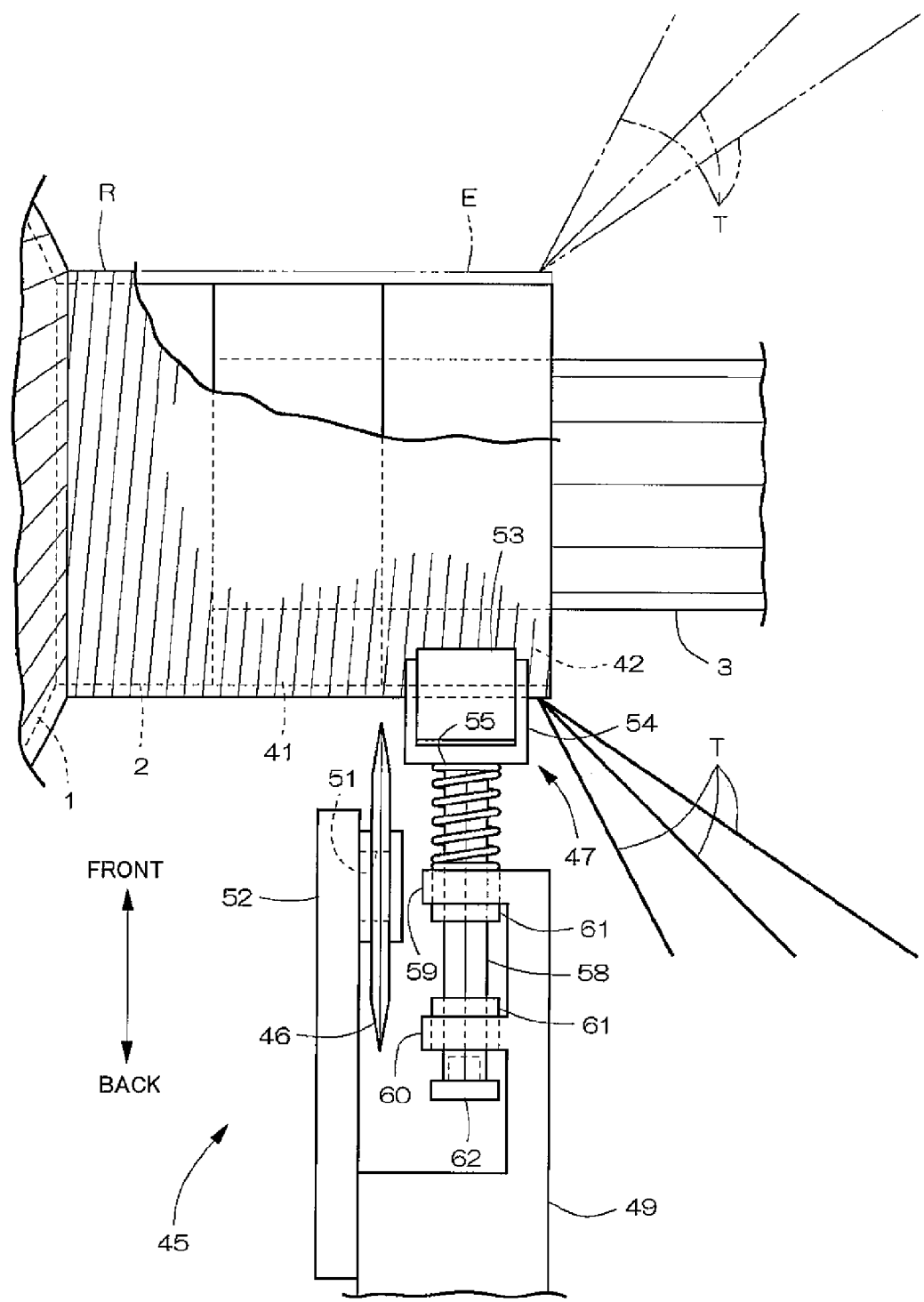
FIG. 4 is a front view showing a state immediately before separating the terminating end of the fiber bundle from the fiber bundle.

FIG. 4 shows a state of the periphery of the transfer rings 41, 42 immediately after the winding process of the fiber bundle R with respect to one mandrel 1 is terminated, where the starting end in the case of performing the winding process on the relevant mandrel 1 is positioned on an outer circumferential surface of the first transfer ring 41 arranged adjacent to the mouth 2. The terminating end E of the fiber bundle R is wound around an outer circumferential surface of the second transfer ring 42 arranged so as to sandwich the first transfer ring 41 with the mouth 2.

The cutting unit 45 is arranged to separate the terminating end E of the fiber bundle R from the fiber bundle R wound around the mandrel 1 after the winding process. The terminating end E is first separated from the fiber bundle R with a cutter 46 of the cutting unit 45 in order to transfer the terminating end E to the mandrel (hereinafter simply referred to as "next mandrel") before the winding process to be loaded in the winding unit next, as shown in FIG. 1. Then, the second transfer ring 42 wound with the terminating end E is switched from the attachment jig 3 of the mandrel 1 after the winding process to the attachment jig 3 of the next mandrel 1. The terminating end E can be transferred as the starting end of winding in the next mandrel 1 in this manner. The details of this "switching" are hereinafter described.

Figure 11:
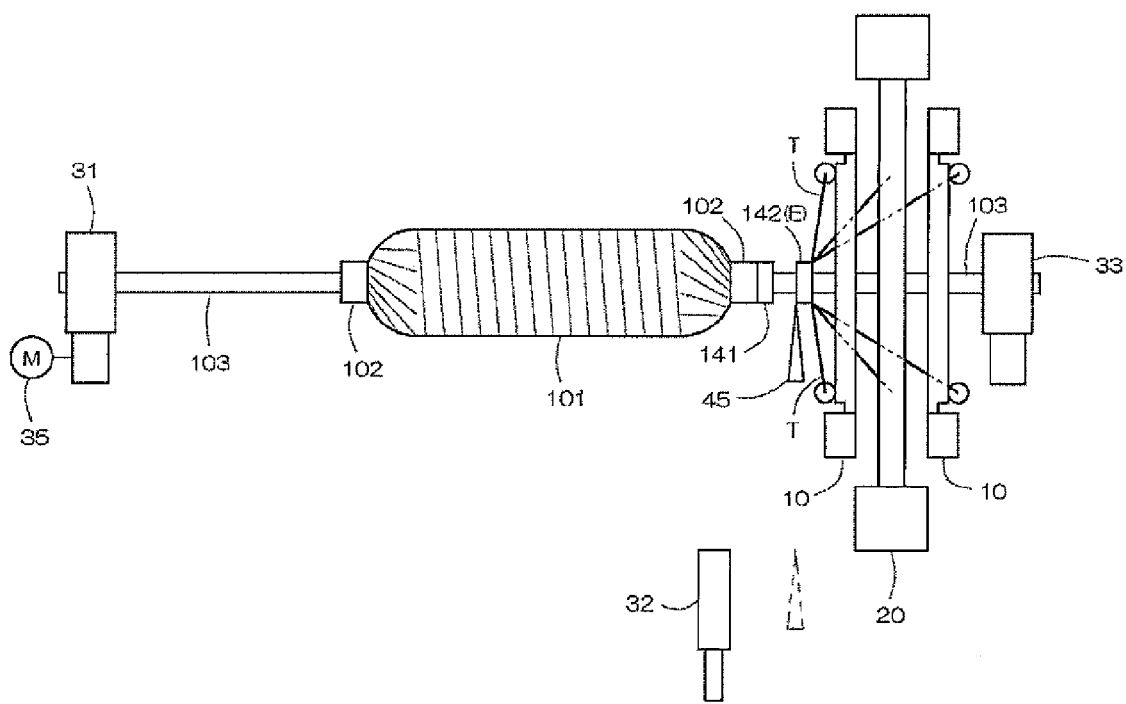
FIG. 11 is an enlarged view of the main parts in the final process.

When separating the terminating end E with the cutting unit 45, consideration needs to be made that the fiber bundle T is bridged between the terminating end E and heads 10, 20 of the winding unit (see FIG. 11). That is, if the terminating end E is separated without positioning and holding the second transfer ring 42, the second transfer ring 42 may be displaced towards the distal end side in the axial direction of the attachment jig 3 by the tensile force of the bridged fiber bundle T, and the fiber bundle T may sag or loosen.

The cutting unit 45 of the transfer mechanism according to the present embodiment thus includes holding means 47 that positions and holds the second transfer ring 42 when cutting the fiber bundle with the cutter 46, as shown in FIG. 1. The holding means 47 includes a friction member 53 that is pressed against the terminating end E of the outer circumferential surface of the second transfer ring 42, where displacement of the second transfer ring 42 caused by tensile force of the fiber bundle T is regulated by pressing the friction member 53 against the terminating end E. Problems such as sagging of the fiber bundle T are thereby prevented from occurring.

The cutting unit 45 is displaceable in a radial direction of the attachment jig 3 by means of a drive mechanism, where the cutter 46 and the holding means 47 are arranged at the distal end side (side of the attachment jig 3) of a substrate 49 coupled to the drive mechanism. In the following description, the radial direction of the attachment jig 3 refers to a front and back direction (distal end side of the substrate 49 is a front side) of the attachment jig 3. See FIGS. 1 and 4 in this regard.

Figure 5:
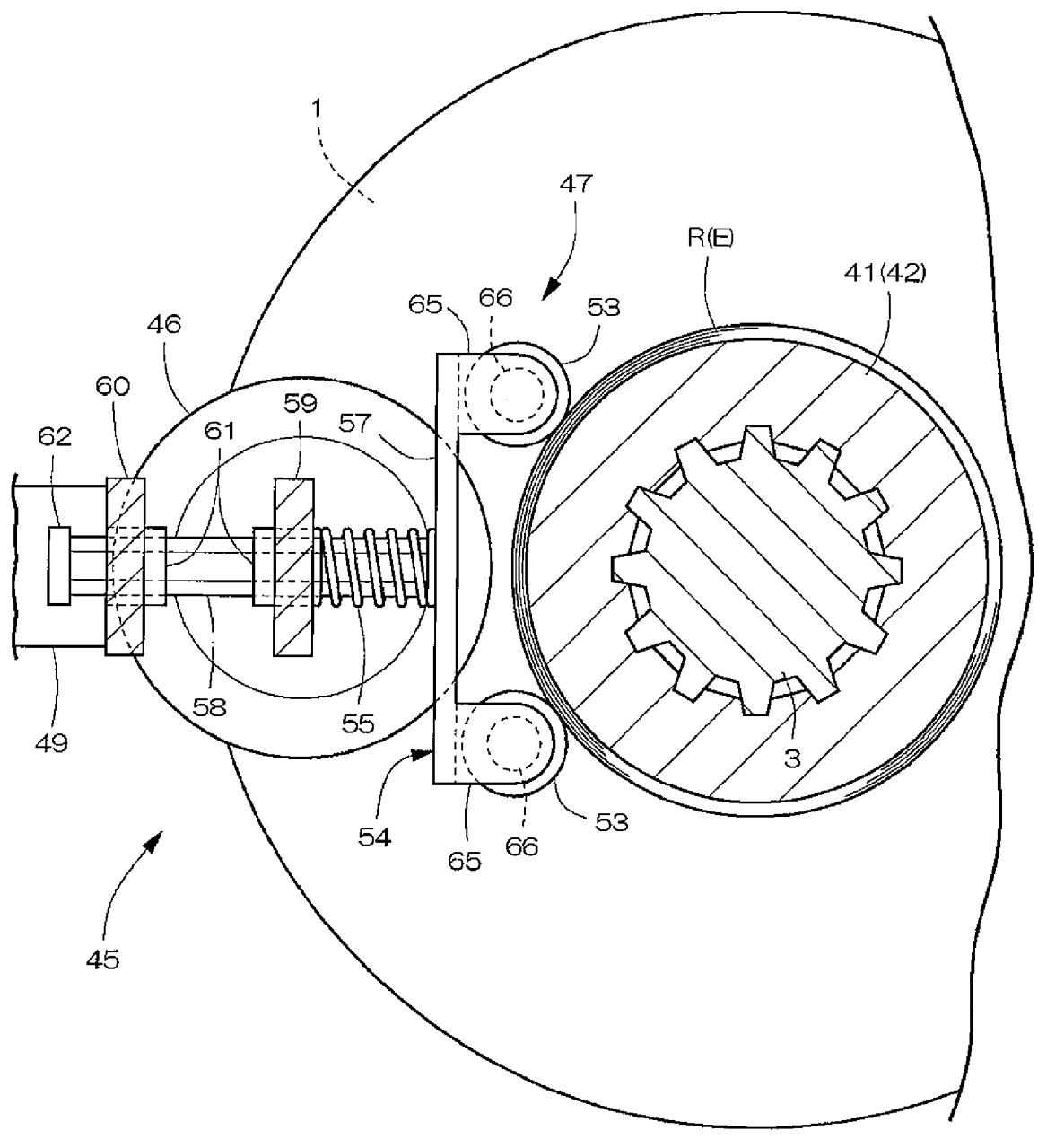
FIG. 5 is a side view showing the state immediately before separating the terminating end of the fiber bundle from the fiber bundle.

As shown in FIGS. 1 and 5, the cutter 46 is formed in a disc-shape with a central part thereof supported in a freely rotating manner by a supporting shaft 51. The supporting shaft 51 is fixed to the substrate 49 by a cutter supporting plate 52. The holding means 47 includes a pair of friction rollers (friction members) 53, 53 to be pressed against the terminating end E, a roller supporting board 54 that rotatably supports the friction rollers 53, 53, and a compression spring (biasing member) 55 that biases the roller supporting board 54 towards the front side with respect to the substrate 49.

The roller supporting board 54 receives a front end of the compression spring 55 at a back surface of a flat plate 57 orthogonal to the front and back direction. The compression spring 55 is externally fitted and attached to a rod 58, which is long in the front and back direction, arranged in a projecting manner at a central part of the back surface of the flat plate 57, and a back end of the compression spring 55 is received by a lateral plate 59 formed at a front end of the substrate 49. Thus, the roller supporting board 54 is biased towards the front side with respect to the substrate 49 by arranging the compression spring 55 between the substrate 49 (lateral plate 59) and the roller supporting board 54 (flat plate 57).

A second lateral plate 60 parallel to the lateral plate 59 is formed on a back side of the lateral plate 59 at the substrate 49. The lateral plates 59, 60 are both formed with a pass-through hole, and a guide 61 that slidably guides the rod 58 in the front and back direction is attached and fixed to each pass-through hole. The rod 58 is formed with a hexagonal cross-section, and engages with the through holes of the guides 61, 61 to regulate rotational displacement of the rod 58 and the roller supporting board 54. A flange 62 is formed in a protruding manner at a back end of the rod 58, and the limiting amount of the projecting dimension of the rod 58 from the lateral plate 59 is regulated by the flange 62 and the second lateral plate 60.

A supporting part 65 of each friction roller 53 is formed in a projecting manner on a front surface of the flat plate 57 of the roller supporting board 54. Each supporting part 65 integrally includes a rotation shaft 66 of the friction roller 53 parallel to the attachment jig 3.

A totally-automated continuous production system of the mandrel 1 wound with the fiber bundle R by the FW device according to the present embodiment is described using FIGS. 6-11. The FW device in this case includes two sets of loading/removing units (first to third chucks), where both loading/removing units perform loading and removal of the mandrel 1 alternately on one winding unit. As two sets of loading/removing units are used, while the winding process is being performed on the mandrel 1 supported by one loading/removing unit, the other loading/removing unit waits in a state of supporting the next mandrel 1. Immediately after the winding process is terminated and the mandrel 1 after the winding process is removed by the one loading/removing unit, the next mandrel is loaded to the winding unit by the other loading/removing unit, and thus the speed of the totally-automated continuous production speed is increased.

In FIGS. 6-11, the chucks of the right loading/removing unit in FIG. 6 are denoted with reference numerals 131, 132 and 133 to distinguish from chucks 31, 32 and 33 of the left loading/removing unit. The mandrel after the winding process of the fiber bundle R, the mouth, the attachment jig, the first transfer ring and the second transfer ring are respectively denoted with reference numerals 101, 102, 103, 141 and 142 to distinguish from the analogous parts of the mandrel before the winding process.

FIG. 6 shows a state immediately after the terminating end E is separated from the wound fiber bundle R in the mandrel 101 after the winding process supported by the right loading/removing unit. The second transfer ring 142 is positioned and held by the holding means 47 of the cutting unit 45. Before the terminating end E is separated, the left loading/removing unit picks up the next mandrel 1 from the transportation line with the first and second chucks 31 and 32, and moves the picked up mandrel onto the center line of the openings 11, 21 of heads 10, 20 configuring the winding unit.

After separating the terminating end E, the left loading/removing unit moves the mandrel 1 supported by the first and second chucks 31 and 32 towards the mandrel 101, and side ends of the attachment jigs 3, 103 contact each other. Thereafter, the left and right loading/removing units simultaneously move the mandrels 1, 101 slightly towards the right.

At this point, the second transfer ring 142 is positioned and held by the holding means 47. Therefore, the second transfer ring 142 is relatively displaced with respect to the attachment jig 103 and separated from the first transfer ring 141 by the movement of the mandrel 101 and the attachment jig 103.

Figure 7:
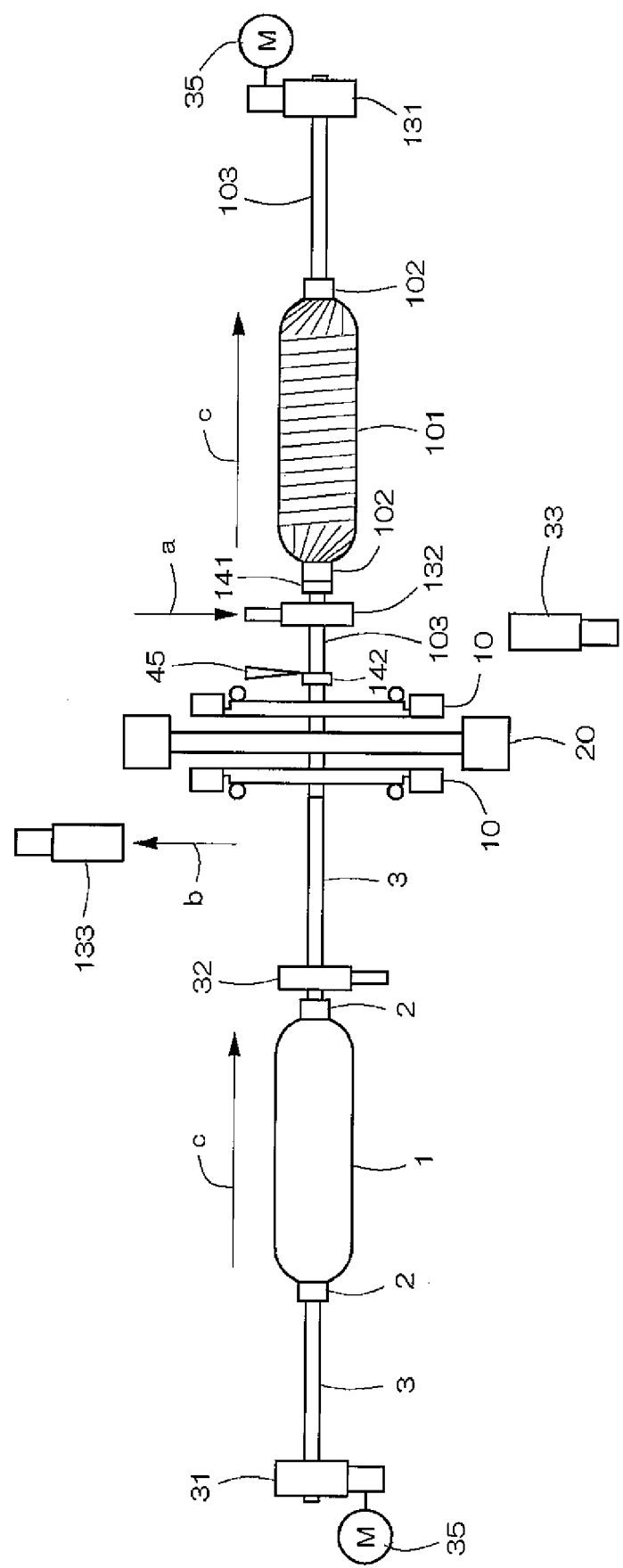
FIG. 7 is an explanatory view of a second process of the manufacturing process of a winding product.

As shown by arrow a in FIG. 7, the right loading/removing unit grips the space between the first transfer ring 141 and the second transfer ring 142 in the attachment jig 103 with the second chuck 132, and separates the third chuck 133 that was holding the attachment jig 103 up to this point as shown by arrow b. Thereafter, the left and right loading/removing units simultaneously move the mandrels 1, 101 in a direction of arrow c. One attachment jig 3 of the mandrel 1 before the winding process passes through the openings 11, 21 of heads 10, 20 of the winding unit in place of the mandrel 101 after the winding process.

In this case as well, the second transfer ring 142 is positioned and held similar to the above. Therefore, the second transfer ring 142 is switched from the attachment jig 103 of the mandrel 101 to the attachment jig 3 of the next mandrel 1 at the point where the mandrels 1, 101 are moved, and the side ends of the attachment jigs 3, 103 contacting each other pass through the through hole of the second transfer ring 142. According to such switching, the terminating end E wound around the second transfer ring 142 is transferred to the next mandrel 1, and thereafter, becomes the starting end of winding in the mandrel 1. That is, the second transfer ring 142 at the mandrel 101 after the winding process is detached from the attachment jig 103, and attached to the attachment jig 3 of the next mandrel 1 as the first transfer ring 41.

Figure 8:
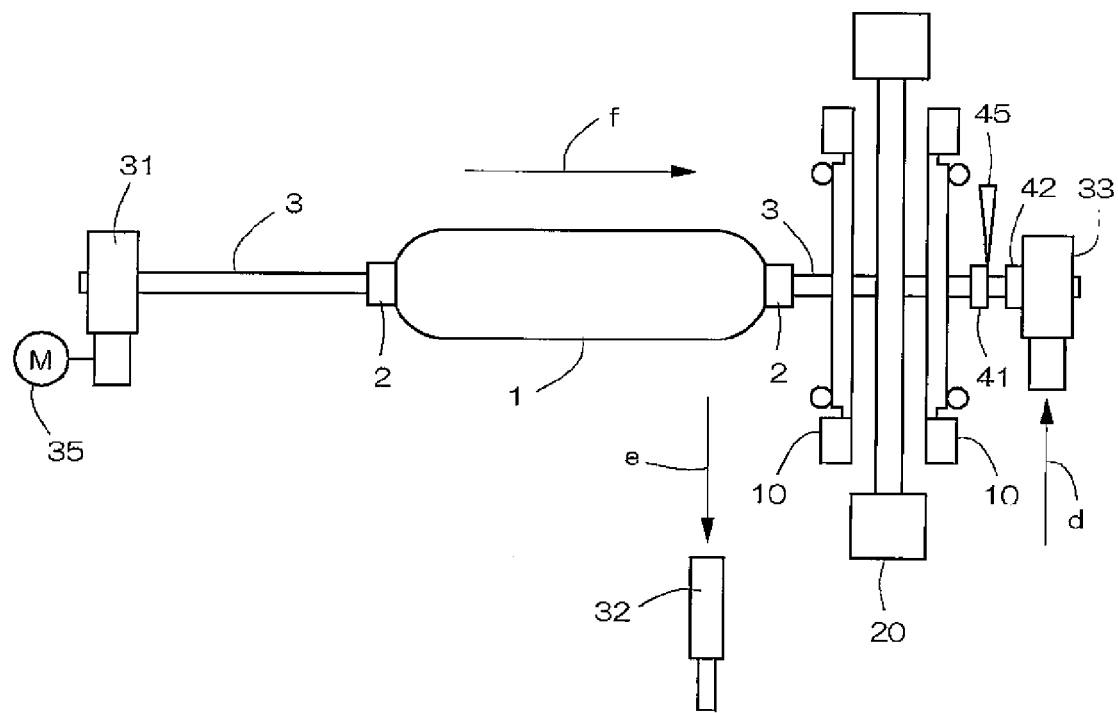
FIG. 8 is an explanatory view of a third process of the manufacturing process of a winding product.
Figure 9:
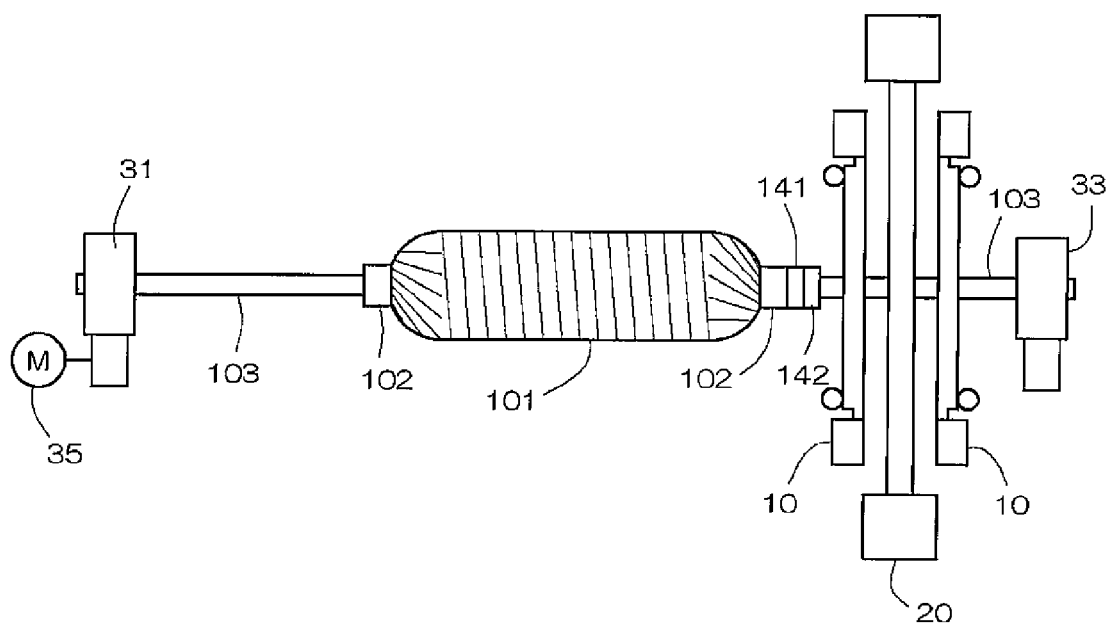
FIG. 9 is an explanatory view of a fourth process of the manufacturing process of a winding product.

As shown in FIG. 8, the second transfer ring 42 is newly attached to the attachment jig 3 of the mandrel 1 attached with the first transfer ring 41. During the winding process on the mandrel 1, the terminating end E of the fiber bundle R is wound around the second transfer ring 42. The left loading/removing unit then grips the side end of the attachment jig 3 with the third chuck 33 as shown by arrow d, and separates the second chuck 32 from the attachment jig 3 as shown by arrow e. Thereafter, the mandrel 1 is moved in a direction of arrow f.

In this case, other than that the first transfer ring 41 is continuously positioned and held by the holding means 47, the second transfer ring 42 is also positioned and held by an arm (not illustrated), and thus the transfer rings 41, 42 are relatively displaced with respect to the attachment jig 3 by the movement of the mandrel 1 and the attachment jig 3. The mouth 2, the first transfer ring 41, and the second transfer ring 42 are then all adjacent to each other.

At the point where the mouth 2 is adjacent to the first transfer ring 41, the winding process is started with the terminating end E positioned on the outer circumferential surface of the first transfer ring 41 as the starting end of winding. The winding unit first winds the fiber bundle R between the first transfer ring 41 and the mouth 2 over a number of times. The first transfer ring 41 becomes non-displaceable with respect to the mouth 2 and the attachment jig 3, and thus the FW device separates the holding means 47 of the cutting unit 45 from the first transfer ring 41 for the first time. Subsequently, the fiber bundle R is wound around the mandrel 1 by heads 10, 20 of the winding unit while first and third chucks 31 and 33 reciprocate and rotate the mandrel 1. After the reinforcing layer is completed by the fiber bundle R on an outer surface of the mandrel 1, heads 10, 20 wind the terminating end E of the fiber bundle R around the second transfer ring 42, and terminate the winding process (see FIG. 9). Since only the terminating end E needs to be wound around the second transfer ring 42, the second transfer ring 42 does not necessarily need to be brought adjacent to the first transfer ring 41 before the start of the winding process, and the second transfer ring 42 may be brought adjacent to the first transfer ring 41 in the middle of the winding process on the mandrel 1 or at the point where the reinforcement layer is completed.

Figure 10:
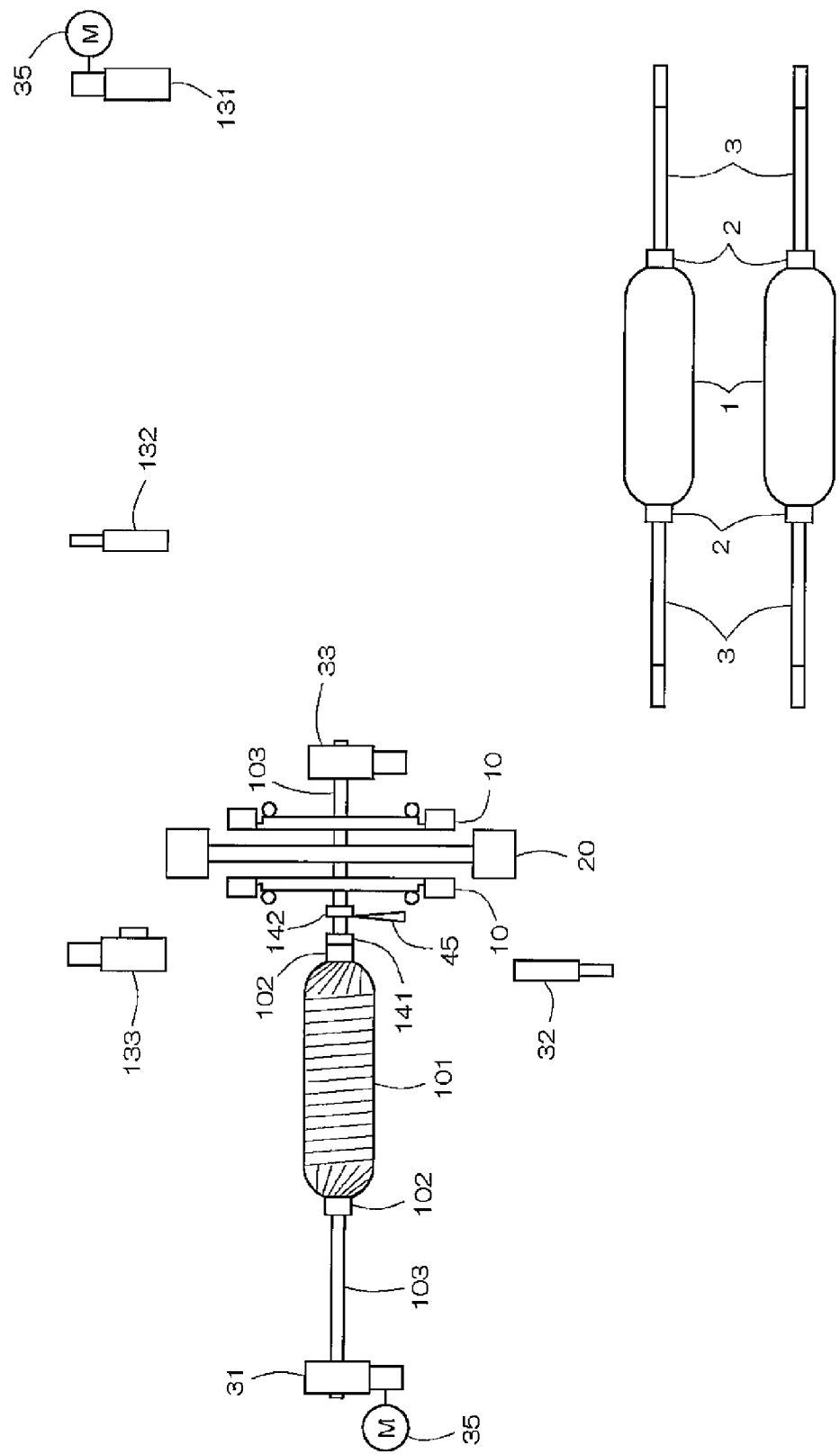
FIG. 10 is an explanatory view of a final process of the manufacturing process of the winding product.

As shown in FIGS. 10 and 11, the FW device separates the terminating end E positioned on an outer circumferential surface of the second transfer ring 142 with respect to the mandrel 101 terminated with the winding process. The FW device is arranged with two cutting units 45 with the arrangement of two sets of loading/removing units, and a cutting unit 45 different from that used immediately before is used for this separation.

The FW device moves the cutting unit 45 towards the attachment jig 103 of the mandrel 101 to separate the terminating end E. The friction rollers 53, 53 of the holding means 47 are pressed against the terminating end E, and the cutter 46 is pressed between the first transfer ring 141 and the second transfer ring 142. When the attachment jig 103 is rotated once in this state, the fiber bundle R is cut on the adjacent edge of the transfer rings 141, 142, and the terminating end E is separated. Since the friction rollers 53, 53 rotate simultaneously with the second transfer ring 142 by the friction force with the fiber bundle R, the fiber bundle R is prevented from being damaged by rubbing.

Before the separation of the terminating end E is terminated, the right loading/removing unit places the mandrel 101 after the winding process on the transportation line, picks up the next mandrel 1 from the transportation line, and moves the same onto the center line of the openings 11, 21 of heads 10, 20. A blank body of a pressure container is continuously manufactured by repeating the above procedures.

Therefore, in the present embodiment, sagging etc. of the fiber bundle T bridged across the terminating end E and the winding unit involved in displacement of the second transfer ring 142 is reliably prevented since displacement of the second transfer ring 142 in the case where the terminating end E is separated is regulated by the holding means 47. Therefore, an FW device having high stability and enabling continuous production is provided without causing winding failure of the fiber bundle R with respect to the mandrel 1 or delay of the totally-automated continuous production system.

In the present embodiment, the holding means 47 is configured by a pair of friction rollers 53, 53, but there may be just one, or three or more friction rollers 53. If three or more friction rollers are provided, the flat plate 57 of the roller supporting board 54 is formed to a partially circular arc shape in side view, and each friction roller 53 is desirably lined in the circumferential direction of the outer circumferential surface of the transfer ring 42. When pressing the plurality of friction rollers 53 against the fiber bundle R (terminating end E), the biasing force of the biasing member is transmitted in a dispersed manner to a plurality of locations on a circumferential surface of the terminating end E, and thus depression etc. of the circumferential surface of the terminating end E caused by pressing the friction roller 53 is prevented.

Furthermore, in the present embodiment, the transfer ring is directly switched from the attachment jig 103 of the mandrel 101 after the winding process to the attachment jig 3 of the next mandrel 1, but can be indirectly switched through a dedicated shaft member and the like. Specifically, the transfer ring attached to the attachment jig 103 of the mandrel 101 after the winding process is first switched to the shaft-shaped member. The next mandrel 1 is loaded after the relevant mandrel 101 is removed from the winding unit, where the transfer ring being attached to the shaft-shaped member is switched to the attachment jig 3 of the mandrel 1 in such loading. This configuration is suitable in the FW device equipped with only one loading/removing unit (one of the left or right loading/removing units in FIG. 6 is omitted).

In addition, the cutter 46 can be displaced in the front and the back direction independent from the holding means 47 with the cutter supporting plate 52 slidable in the front and the back direction with respect to the substrate 49. The loading/removing unit has three roles of loading the mandrel 1 before the winding process to the winding unit, supporting the mandrel 1 during the winding process, and removing the mandrel 101 after the winding process from the winding unit. However, these roles may be separately configured. For instance, the supporting unit of the mandrel 1 may be arranged in the winding unit, and the loading operation and the removing operation on the supporting unit may be carried out using different chucks.

While the present invention has been described with respect to embodiments thereof, it will be apparent to those skilled in the art that the invention may be modified in numerous ways and may assume many embodiments other than those specifically set out and described herein. Accordingly, the appended claims cover all modifications that fall within the true spirit and scope of the present invention.

What is claimed is:

1. A filament winding apparatus comprising:
   a winding unit winding a fiber bundle around a mandrel;
   a loading/removing unit loading a mandrel before a winding process to the winding unit, and removing the mandrel from the winding unit after the winding process; and
   a transfer mechanism separating a terminating end of the fiber bundle from the fiber bundle wound around the mandrel after the winding process, and transferring the terminating end to the mandrel before the winding process; wherein
   the filament winding apparatus further includes:
      a cutter cutting the fiber bundle wound around a first transfer member integral with the mandrel after the winding process and a second transfer member to be switched to the mandrel before the winding process between the first and the second transfer members, and
      holding means for positioning and holding the second transfer member during the cutting by the cutter.

2. The filament winding apparatus according to claim 1, wherein
   the holding means includes a friction member to be pressed against an outer circumferential surface of the second transfer member, and a biasing member biasing the friction member towards the second transfer member; and
   the friction member is a friction roller rotatably supported by a shaft parallel to a shaft-shaped attachment jig fixed to the mandrel.

3. The filament winding apparatus according to claim 2, wherein
   the holding means includes a roller supporting board subjected to biasing force from the biasing member; and
   a plurality of the friction rollers is lined in a circumferential direction of the outer circumferential surface of the second transfer member, and axially supported by the roller supporting board.

4. The filament winding apparatus according to claim 3, wherein there are two friction rollers.

5. The filament winding apparatus according to claim 2, wherein the first and second transfer members are transfer rings.

6. The filament winding apparatus according to claim 5, wherein the transfer rings have outer diameters that are equal to an outer diameter of a mouth of the mandrel.

7. The filament winding apparatus according to claim 5, wherein the transfer rings are in a splined engagement with the attachment jig, so that the transfer rings rotate with the attachment jig and can be axially displaced relative to the attachment jig.

8. The filament winding apparatus according to claim 2, wherein the biasing member is a compression spring.

9. The filament winding apparatus according to claim 2, wherein the friction roller simultaneously rotates with the second transfer member.

10. A filament winding method comprising:
    winding a fiber bundle around a first mandrel;
    separating a terminating end of the fiber bundle from the first mandrel by cutting the fiber bundle between a first transfer member integral with the first mandrel and a second transfer member comprising the terminating end;

regulating tensile force applied by the fiber bundle to the terminating end when the terminating end is separated by pressing a friction member against the second transfer member; and transferring the terminating end to a second mandrel.

11. The filament winding method of claim 10, wherein the step of transferring the terminating end to the second mandrel comprises:

switching the second transfer member from a first jig supporting the first mandrel to a second jig supporting the second mandrel.

12. The filament winding method of claim 11, wherein the second transfer member is switched from the first jig to the second jig by axially displacing the first and second jigs relative to the second transfer member.

13. The filament winding method of claim 12, wherein after the second transfer member is switched to the second mandrel, the terminating end of the fiber bundle on the second transfer member becomes the starting end of the fiber bundle for the second mandrel.

\* \* \* \* \*